A. Thayer,
Shears and Scissors.
Nº 80,432. Patented July 28, 1868.
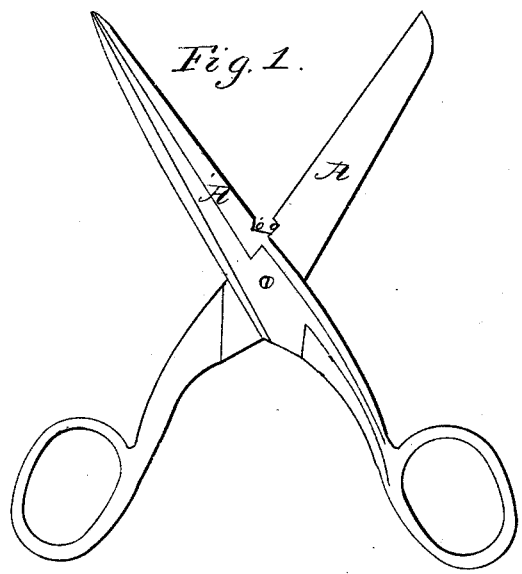
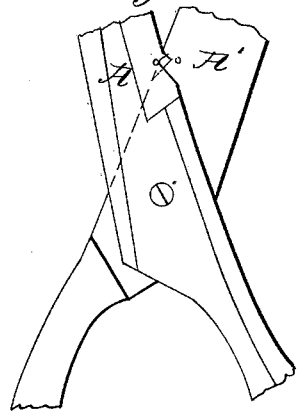 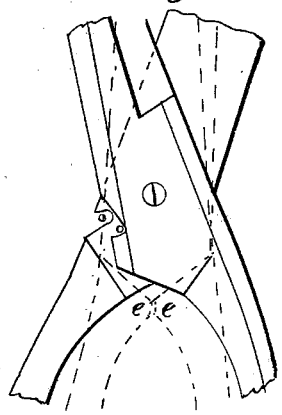 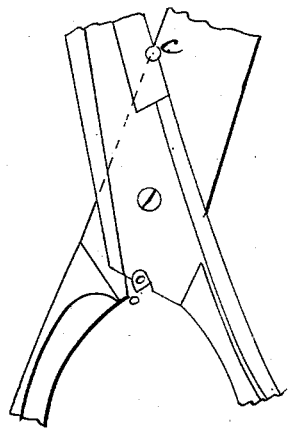
Witnesses
W. Reid
Alex Selkirk
Inventor
Augustus Thayer

United States Patent Office.

AUGUSTUS THAYER, OF ALBANY, NEW YORK.

Letters Patent No. 80,432, dated July 28, 1868.

---

IMPROVEMENT IN SCISSORS AND SHEARS.

---

The Schedule referred to in these Letters Patent and making part of the same.

---

TO ALL WHOM IT MAY CONCERN:

Be it known that I, AUGUSTUS THAYER, of the city and county of Albany, State of New York, have invented certain new and useful Improvements in Scissors and Shears, whereby, with the one and same instrument, milliners, artificial-flower makers, upholsterers, sheet-metal workers, and others, can cut or sever wires, cords, and other similar hard substances, and also hold or pull on wires, needles, and the like, when required, as well as do their ordinary cutting with the blades of the said shears or scissors; and I do hereby declare that the following is a full, clear, and exact description thereof, reference being had to the accompanying drawings, forming a part of this specification, in which—

Figure 1 represents a pair of shears with clipping-notches placed front of the pivot.

Figure 2 is a section of shears with notches placed to give a sliding cut.

Figure 3 is a section of shears with clipping-notches placed on the outer edges of the blades, and also the holding-notches.

Figure 4 is a section of shears, showing a circular form of clipping-notches, and also their places back of the pivot.

The nature of my invention consists of forming clipping-notches into one or both blades of scissors or shears, at or near the point of the angle formed by the two blades when open, or on the heels of the blades back of the pivot, or on the outer edges of the blades, and also holding-notches in some suitable place, as in the heels of the blades.

The clipping-notches may be angular, circular, or any other suitable form, and may be placed either forward or back, or at one side of the pivot, and, when thus placed, wires, cords, and similar hard substances may be readily cut or severed without interfering with the cutting-edges of the blades.

The holding-notches, for holding or pulling needles, wires, and the like, are placed in the heels of the blades, and may be of sizes adapted to the work the shears or scissors are intended for.

To enable others skilled in the art to make and use my invention, I will proceed to describe it in reference to the drawings, and letters of reference marked thereon, the same letters indicating like parts.

A A' represent the two blades of an ordinary pair of shears or scissors, which are provided with clipping-notches $o$ $o'$, at or near the point of the angle formed by the blades when open, as in figs. 1 and 2, or notches $o''$ $o''$ formed on the outer edges of the said blades, as in fig. 3, or in the heels of the blades back of the pivot $p$, as in fig. 4.

To give a sliding cut, when the instrument is being operated, one of the notches is placed a little nearer the pivot $p$ than the other, whether the notches are placed forward of the said pivot or back of the same, or to one side, on the outer edges of the blade. If desired to have the clipping done by one notch in one blade only, such a notch should be made at the point of the angle of the blades forward of the pivot $p$. The clipping-notches may be angular, as in figs. 1 and 2, or circular, as $c$ $c$, fig. 4, or any other suitable form for cutting.

The holding-notches $e$ $e$ are formed on the heels of the shears, as is shown by the red full and dotted lines in fig. 3, which represents shears nearly closed.

One or more of these said holding-notches $e$ $e$ may be placed in the heels of the blades, as shown, so as to be adapted to a variety of sizes of needles or wires, &c.

The advantages of these improvements in shears are these:

First. The milliner, artificial-flower maker, upholsterer, sheet-metal worker, sewing-machine operator, &c., can, with the one and same instrument, (the shears,) cut ribbons, fabrics, leather, sheet metals, also wires, cords, and similar hard substances, without dulling the edges of the blades, and also hold and adjust needles in sewing-machines, or hold and pull on wires, cords, or needles, as may be required.

Second. This improvement dispenses with the necessity of employing three instruments, now usually employed by such workers, viz, shears, nippers, and grasping-pliers.

Third. Heavy wire may be cut with greater ease with the instrument, if provided with a sliding cut, than by the ordinary cutting-nippers generally used.

Fourth. For ordinary domestic use, shears with these improvements would be of great utility for many purposes for mechanical work incidental in a family.

Having described my invention, what I claim, and desire to secure by Letters Patent, is—

1. The clipping-notches $o\ o'\ o''$, or $c\ c$, or their equivalents, placed forward or back of the pivot $p$, or in the outer edges of the blades to one side, in combination with the blades $A\ A'$, and the said notches so placed as to give a sliding cut, as and for the purpose set forth and described.

2. The holding-notches $e\ e$, in one or more sets, placed in the heels of the blades, as and for the purposes set forth and described.

AUGUSTUS THAYER.

Witnesses:
 W. REID,
 ALEX. SELKIRK.